United States Patent [19]

Yang

[11] Patent Number: 5,782,713
[45] Date of Patent: Jul. 21, 1998

[54] BICYCLE GEAR CRANK ARRESTING DEVICE

[76] Inventor: Shu-Chiung C. Yang, No. 9-1, Lane 20, Rong-Hua Street, Taichung City, Taiwan

[21] Appl. No.: 568,377

[22] Filed: Dec. 6, 1995

[51] Int. Cl.[6] .................................................. F16H 55/12
[52] U.S. Cl. ........................ 474/160; 474/152; 280/259; 74/594.2
[58] Field of Search .................... 474/77, 116, 160, 474/152; 74/594.1, 594.2, 594.3, 594.4; 280/259, 236; D12/122, 123

[56] References Cited

U.S. PATENT DOCUMENTS

| | | | |
|---|---|---|---|
| D. 365,049 | 12/1995 | Kuylman | D12/123 |
| 2,630,020 | 3/1953 | Juy | 474/116 |
| 3,815,439 | 6/1974 | Tarutani | 474/160 |
| 3,888,136 | 6/1975 | Lapeyre | 280/259 |
| 5,085,620 | 2/1992 | Nagano | 474/152 |
| 5,217,413 | 6/1993 | Nagano | |
| 5,246,402 | 9/1993 | Romano | 74/594.2 |
| 5,480,359 | 1/1996 | Tani | 474/160 |
| 5,493,937 | 2/1996 | Edwards | 280/259 X |
| 5,518,456 | 5/1996 | Kojima et al. | 474/77 |

*Primary Examiner*—David J. Bagnell
*Assistant Examiner*—Frederick L. Lagman
*Attorney, Agent, or Firm*—Browdy and Neimark

[57] ABSTRACT

The bicycle gear crank arresting device comprises an axle, a first arresting member and a second arresting member. The axle is fastened pivotally with the five-way tube of a bicycle frame and is provided with a rotary rod. The first arresting member comprises a crank portion having an arcuate section and a linear section, which are connected at an intersection where an inclined line extending from the midpoint of the axis of the axle and forming a predetermined angle with the axis of the axle meets with a straight line extending from the outer side of the gear piece of the first arresting member for a predetermined distance. The linear section is perpendicular to the axis of the axle. The second arresting member has a crank portion corresponding in profile to the crank portion of the first arresting member. The first arresting member and the second arresting member are fastened with the rotary rod of the axle.

7 Claims, 3 Drawing Sheets

BICYCLE GEAR CRANK ARRESTING DEVICE

FIELD OF THE INVENTION

The present invention relates generally to a bicycle driving mechanism, and more particularly to a bicycle gear crank arresting device.

BACKGROUND OF THE INVENTION

The conventional bicycle crank at work is rather prone to hit the gear chain guard or the rear fork. As a result, the ankles of a bicyclist are vulnerable to injuries caused by the protruded portion at which the crank and the crank axle are fastened together. The conventional remedial approach is to bend the crank so as to prevent the crank from making contact with the gear chain guard or the rear fork. However, such a remedial approach as described above is defective in design in that it undermines the riding efficiency of the bicycle.

The U.S. Pat. No. 5,217,413 discloses a bicycle multi-stepped gear crank which is mounted on the axle. The crank is connected at the center thereof with a gear disk. The crank comprises a first handle and a second handle. The first handle is slanted outwards from the line defining the inner end of the crank such that the first handle forms an angle of 110 degrees and an angle of 120 degrees in relation to the crank axle. The second handle is connected with the first handle such that the second handle and the axle form an angle of 90 degrees. The first handle is slanted outwards so as to prevent it from hitting other component parts of the bicycle.

The bicycle multistepped gear crank disclosed in the U.S. Pat. No. 5,217,413 is not compatible with most of bicycles which are built in accordance with various specifications. In addition, it must be used in conjunction with a correcting device.

SUMMARY OF THE INVENTION

It is therefore primary objective of the present invention to provide a bicycle gear crank arresting device which is compatible with all bicycles.

It is another objective of the present invention to provide a bicycle gear crank arresting device capable of prevention of bodily injuries of a bicyclist.

It is still another objective of the present invention to provide a bicycle gear crank arresting device which can be adjusted to uphold the riding efficiency of the bicycle without the use of a correcting apparatus.

The foregoing objectives of the present invention are attained by a bicycle gear crank arresting device, which comprises an axle fastened pivotally with the five-way tube of a bicycle frame and provided with a rotary rod extending outwards therefrom. The rotary rod is provided at both ends thereof with a first arresting member and a second arresting member. The first arresting member is composed of a gear set and a first crank set. The gear set has at least one gear piece provided with a plurality of through holes. The first crank set has a disk portion and a crank portion. The disk portion is provided with a plurality of slots corresponding in location to the through holes of the gear piece. The rotary rod is put through the center of the disk portion. The slots have respectively a predetermined depth. The slots are provided respectively around the top rim thereof with a female thread and at the bottom thereof with a spring. The disk portion is provided with an arcuate section and a linear section. The arcuate section has an arcuate locus similar to that of the rear forks of the five-way tube. The linear section is perpendicular to the axis of the axle. The second arresting member has a crank portion similar in profile to the crank portion of the first arresting member. The second arresting member is provided with a pedal fastened pivotally therewith.

DETAILED DESCRIPTION OF THE INVENTION

Figure 1:
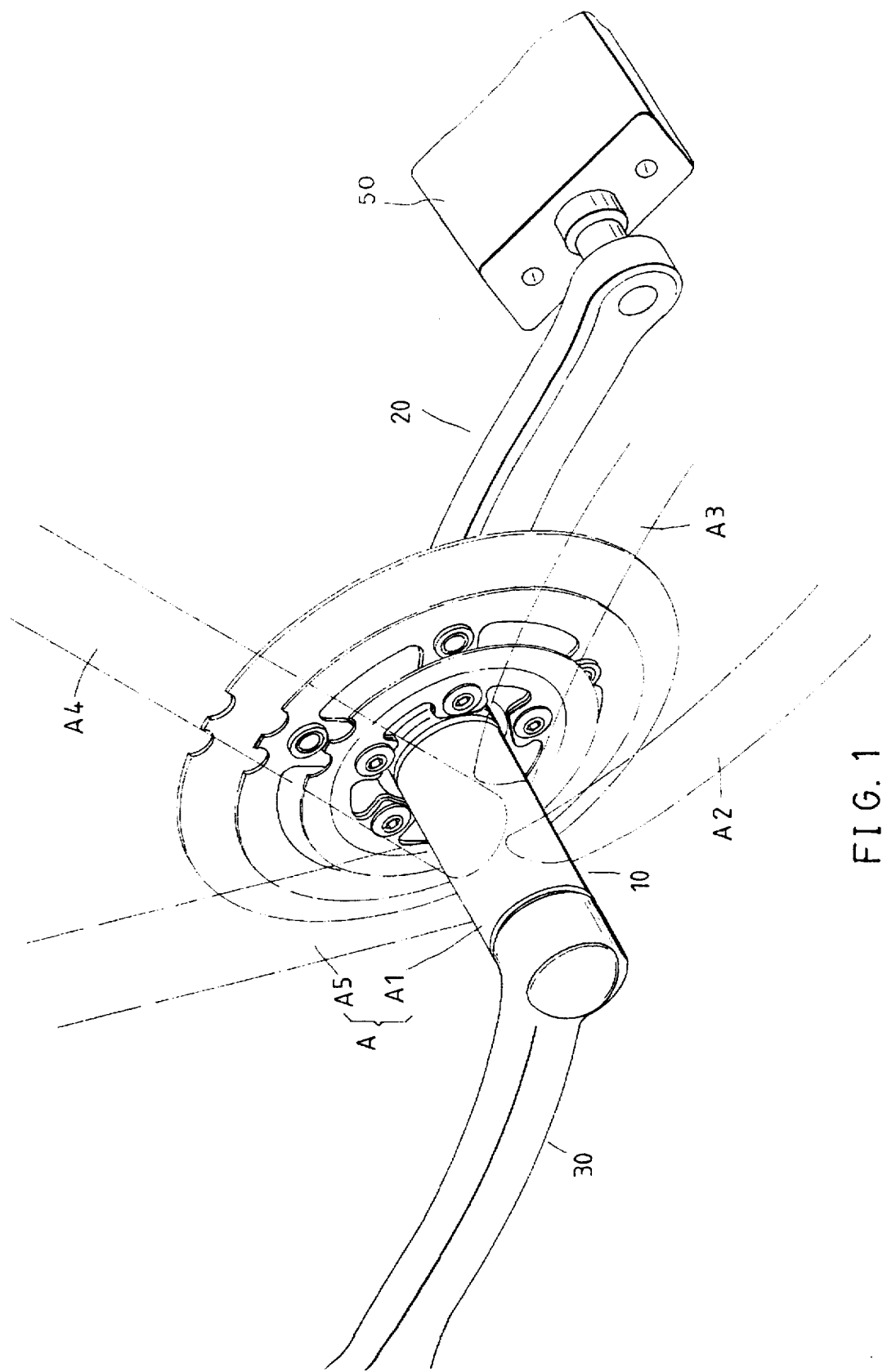
FIG. 1 shows a perspective view of the present invention.
Figure 2:
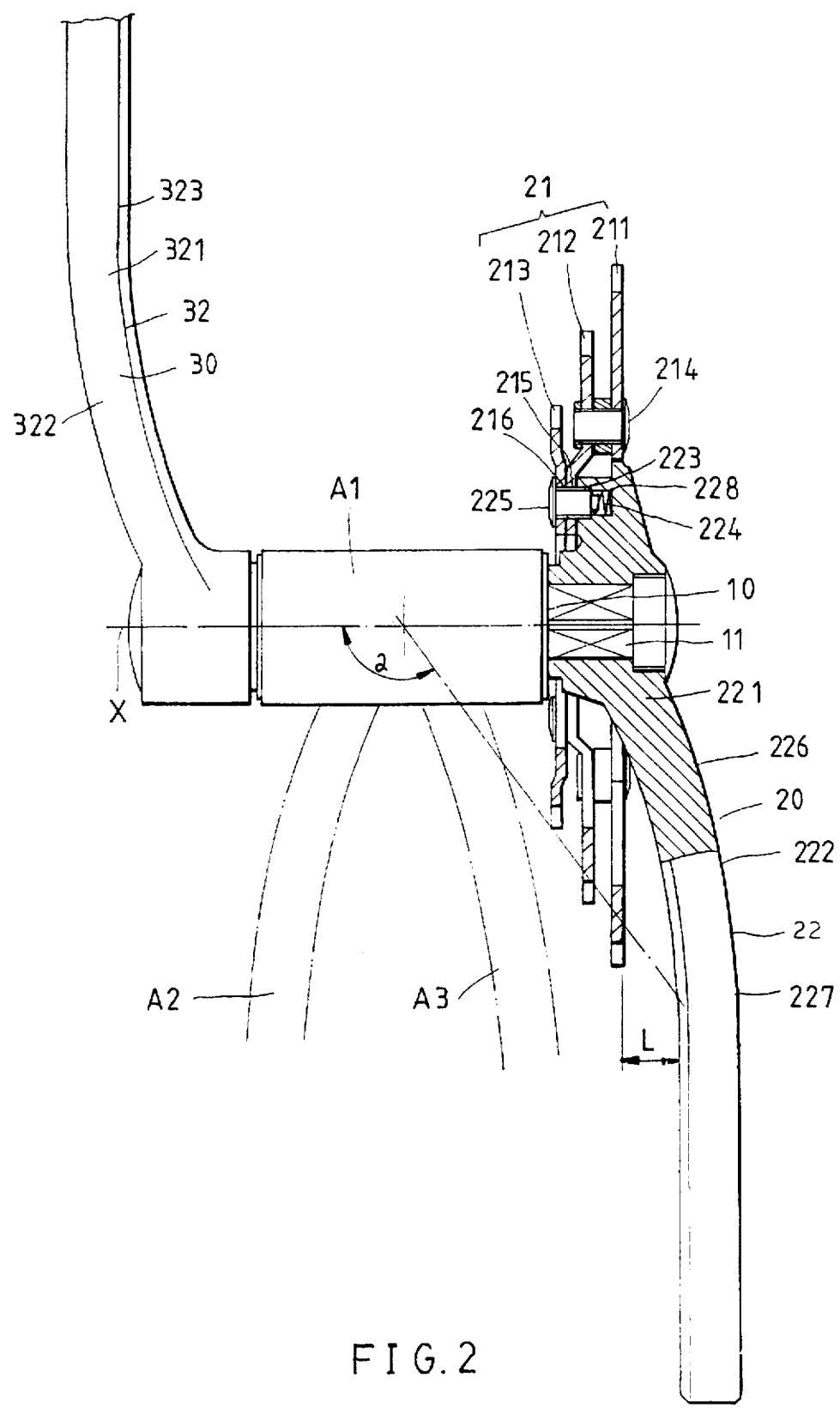
FIG. 2 shows a partial sectional view of the present invention as shown in FIG. 1.
Figure 3:
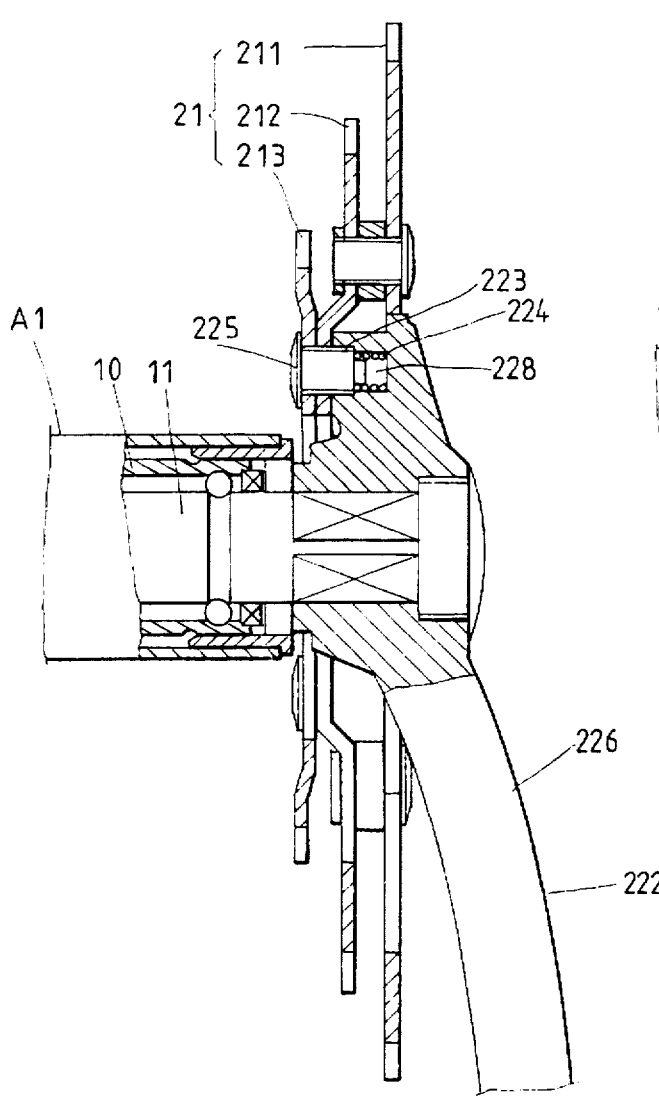
FIG. 3 is an enlarged view of FIG. 2 to show schematically the combination of the gear set of the first arresting member and the first crank set.

As shown in FIGS. 1-3, a bicycle gear crank arresting device of the present invention comprises an axle 10, a first arresting member 20, and a second arresting member 30. A conventional pedal 50 is shown attached to the arresting member 20. The arresting member 30 is shown without a pedal.

The axle 10 is fastened pivotally with the shaft tube $A_1$ of the five-way tube A of a bicycle frame. The five-way tube A is composed of the shaft tube $A_1$, rear forks $A_2$ and $A_3$, the seat tube $A_4$, and the down tube $A_5$. The axle 10 has a rotary rod 11 capable of rotating freely.

The first arresting member 20 is fastened securely with one end of the rotary rod 11 of the rolling shaft 10 and is composed of a gear set 21 and a first crank set 22. The gear set 21 has a large gear piece 211, intermediate gear piece 212, and a small gear piece 213, which are arranged in that order at intervals. The large gear piece 211 and the intermediate gear piece 212 are located by means of a plurality of screws 214. The intermediate gear piece 212 and the small gear piece 213 are provided respectively and correspondingly with five through holes 215 and 216. The first crank set 22 has integrally a disk portion 221 and a crank portion 222. The rotary rod 11 of the axle 10 is put through the center of disk portion 221. The disk portion 221 is provided with five slots 228 corresponding in location to the through holes 215 and 216. The slots 228 have respectively a predetermined depth and are provided respectively around the upper rim thereof with a female thread 223. The slots 228 are further provided respectively at the bottom thereof with a spring 224. Five screws 225 are received respectively in the through holes 215 and 216 to engage respectively the female thread 223 of each of the slots 228. When the gear set 21 is fastened with the first crank set 22, the bottom end of each of the screws 225 is urged by the biasing means or spring 224 so as to cause the female thread to engage more securely with the male thread. The crank portion 222 has a disk portion 221 provided with an arcuate section 226 and a linear section 227. The arcuate section 226 is provided on the inner side thereof with an arcuate locus similar to that of the rear fork $A_3$ of the five-way tube A. The end of the inner side of the arcuate section 226 is connected with the linear section 227 at an intersection where an inclined line extending from the midpoint of the axis X of the axle 10 and forming angle of 131-136 degrees with the axis X of the axle 10 meets with a straight line extending from the outer side of the gear piece 211 for a distance L of 13–15 mm. The linear section 227 is perpendicular to the axis X of the axle 10 and is provided at one end thereof with a pedal fastened pivotally therewith.

The second arresting member 30 is fastened securely with another end of the rotary rod 11 of the axle 10 and is composed of a second crank set 32 having a crank portion 321, an arcuate section 322 and a linear section 323. The arcuate section 322 has a curved profile similar to that of the arcuate section 225 of the crank portion 222 of the first crank set 22. The linear section 323 is perpendicular to the axis X of the axle 10 and is provided at one end thereof with a pedal fastened pivotally therewith.

The arcuate section 226 and the linear section are connected at the intersection where the inclined line extending from the midpoint of the axis X of the axle 10 and forming, angle of 131–136 degrees with the axis X of the axle 10 meets with a straight line extending from the outer side of the large gear piece 211 for a distance L of 13–15 mm. As a result, the crank portion 222 is capable of cooperating with various wheel rims, tires, the rear forks having various dividing angles, gear pieces, and the chain guards. In addition, the arcuate section 226 of the crank portion 222 has a profile similar to that of the rear forks. As a result, the crank portion 222 at work is not prone to hit the rear forks, the chain guard and other component parts contiguous to the crank portion 222.

Figure 4:
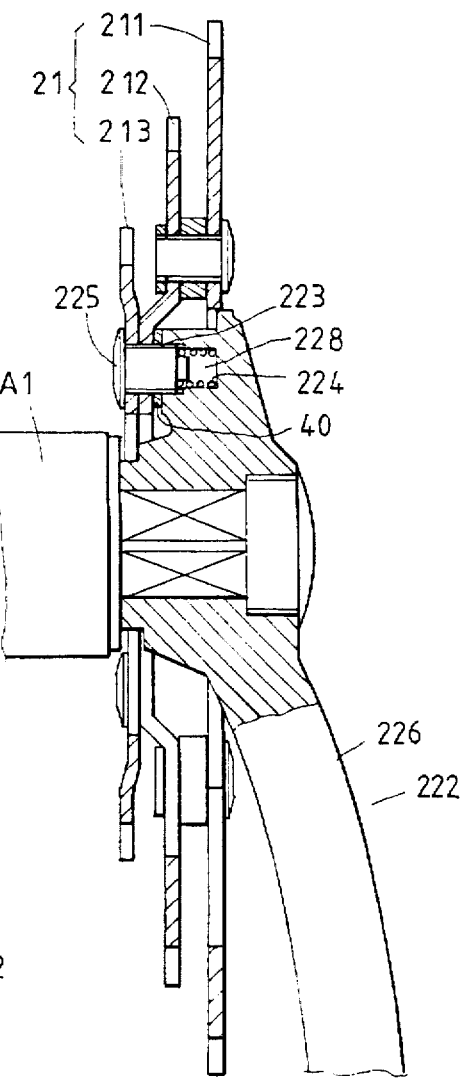
FIG. 4 is an enlarged view of FIG. 2 to show schematically another form of combination of the gear set of the first arresting member and the first crank set.

As shown in FIG. 4, the slots 228 are provided respectively on the outer side thereof with a pad 40 for causing the crank set to move outwards an appropriate distance. The engaging surface of the female and the male threads are urged securely by the spring 224 for making the microadjustment easy without the use of the conventional correcting device which often disturbs the vertical relationships between the pedal and the longitudinal line of the bicycle frame. The present invention is therefore suitable for use in a bicycle having the chain guard of an extra large size of a special form.

The structural design of the present invention is based on the midpoint of the axis of the axle of a bicycle. As a result, the device of the present invention can avert the mechanical interference between the crank and the component parts contiguous to the crank. In addition, the device of the present invention is safe and compatible with bicycles of all models and sizes.

The bicycle gear crank arresting device of the present invention can be easily adjusted without the use of a correcting device capable of undermining the operating efficiency of the bicycle.

What is claimed is:

1. A bicycle gear crank arresting device, which comprises:
   an axle fastened pivotally with a five-way tube of a bicycle frame and provided with a rotary rod capable of rotating freely;
   a first arresting member fastened with one end of said rotary rod and composed of a gear set and a first crank set, said gear set provided with at least one gear piece having a plurality of through holes, said first crank set provided with a disk portion and a crank portion, said disk portion having a plurality of slots corresponding in location to said through holes, said slots having respectively a predetermined depth and a female thread engageable with a male thread of a screw received in one of said through holes; and
   a second arresting member fastened with another end of said rotary rod;
   wherein said crank portion has an arcuate section and a linear section, said arcuate section having an arcuate locus on an inner side thereof facing said locus similar to an arcuate locus of rear forks of said five-way tube of said bicycle frame, said arcuate section and said linear section meeting at an intersection point from which an inclined line extends to a midpoint of an axis between ends of said axle forming a predetermined angle with said axis of said axle and said inclined line meets with a straight line extending from the intersection point and parallel to said axis a distance (L) from an outer side of said gear piece for a predetermined distance, and said linear section is perpendicular to said axis of said axle; and wherein said second arresting member has a crank portion fastened at one end thereof with said rotary rod and at another end thereof with a pedal, said crank portion of said second arresting member being corresponding in profile to said crank portion of said first arresting member.

2. The device as defined in claim 1, wherein said predetermined angle formed by said inclined line and said axis of said axle ranges between 131 degrees and 136 degrees; and wherein said distance by which said straight line extends from said gear piece ranges between 13 mm and 15 mm.

3. A bicycle gear crank arresting device, which comprises:
   an axle fastened pivotally with a five-way tube of a bicycle frame and provided with a rotary rod capable of rotating freely;
   a first arresting member fastened with one end of said rotary rod and composed of a gear set and a first crank set, said gear set provided with at least one gear piece having a plurality of through holes, said first crank set provided with a disk portion and a crank portion, said disk portion having a plurality of slots corresponding in location to said through holes, said slots having respectively a predetermined depth and a female thread engaged to a male thread of a screw received in one of said through holes; and
   a second arresting member fastened with another end of said rotary rod;
   wherein said crank portion has an arcuate section and a linear section, said arcuate section having an arcuate locus similar to an arcuate locus of rear forks of said five-way tube of said bicycle frame, said arcuate section and said linear section being connected at an intersection where an inclined line extending from a midpoint of an axis between ends of said axle and forming a predetermined angle ($\alpha$) with said axis of said axle meets with a straight line extending from the intersection point and parallel to said axis a distance (L) from an outer side of said gear piece for a predetermined distance said linear section being perpendicular to said axis of said axle; and
   wherein said second arresting member has a crank portion fastened at one end thereof with said rotary rod and at another end thereof with a pedal, said crank portion of said second arresting member being corresponding in profile to said crank portion of said first arresting member; and
   wherein said crank portions of said first arresting member and said second arresting member are provided respectively at one end thereof with a pedal fastened pivotally therewith, wherein said slots are provided therein respectively with a biasing means engaged between said screw and a bottom of said slots to improve engagement of said female thread to said male thread.

4. A bicycle gear crank arresting device, which comprises:

an axle fastened pivotally with a five-way tube of a bicycle frame and provided with a rotary rod capable of rotating freely;

a first arresting member fastened with one end of said rotary rod and composed of a gear set and a first crank set, said gear set provided with at least one gear piece having a plurality of through holes, said first crank set provided with a disk portion and a crank portion, said disk portion having a plurality of slots corresponding in location to said through holes, said slots having respectively a predetermined depth and a female thread engaged to a male thread of a screw received in one of said through holes; and a second arresting member fastened with another end of said rotary rod;

wherein said crank portion has an arcuate section and a linear section, said arcuate section having an arcuate locus similar to an arcuate locus of rear forks of said five-way tube of said bicycle frame, said arcuate section and said linear section being connected at an intersection where an inclined line extending from a midpoint of an axis between ends of said axle and forming a predetermined angle ($\alpha$) with said axis of said axle meets with a straight line extending from the intersection point and parallel to said axis a distance (L) from an outer side of said gear piece for a predetermined distance said linear section being perpendicular to said axis of said axle; and wherein said second arresting member has a crank portion fastened at one end thereof with said rotary rod and at another end thereof with a pedal, said crank portion of said second arresting member being corresponding in profile to said crank portion of said first arresting member; and wherein said crank portions of said first arresting member and said second arresting member are provided respectively at one end thereof with a pedal fastened pivotally therewith, wherein a pad of an appropriate thickness is located around said slots and said through holes between said gear piece and said disk portion to permit micro adjustment of a distance between said gear piece and said disk portion.

5. A bicycle gear crank arresting device, which comprises:

an axle fastened pivotally with a five-way tube of a bicycle frame and provided with a rotary rod capable of rotating freely;

a first arresting member fastened with one end of said rotary rod and composed of a gear set and a first crank set, said gear set provided with at least one gear piece having a plurality of through holes, said first crank set provided with a disk portion and a crank portion, said disk portion having a plurality of slots corresponding in location to said through holes, said slots having respectively a predetermined depth and a female thread engageable with a male thread of a screw received in one of said through holes; and a second arresting member fastened with another end of said rotary rod;

wherein said crank portion has an arcuate section and a linear section, said arcuate section having an arcuate locus on an inner side thereof facing said locus similar to an arcuate locus of rear forks of said five-way tube of said bicycle frame, said arcuate section and said linear section meeting connected at an intersection point from which an inclined line extends to a midpoint of an axis between ends of said axle forming a predetermined angle with said axis of said axle and said inclined line meets with a straight line extending from an outer side of said gear piece for a predetermined distance, and said linear section is perpendicular to said axis of said axle; and wherein said second arresting member has a crank portion fastened at one end thereof with said rotary rod and at another end thereof with a pedal, said crank portion of said second arresting member being corresponding in profile to said crank portion of said first arresting member; and wherein said crank portions of said first arresting member and said second arresting member are provided respectively at one end thereof with a pedal fastened pivotally therewith.

6. The device as defined in claim 5, wherein the distance (L) is between 13 to 15 mm.

7. The device as defined in claim 5, wherein said slots are provided therein respectively with a biasing means engaged between said screw and a bottom of said slots to improve engagement of said female thread to said male thread; and wherein a pad of an appropriate thickness is located around said slots and said through holes between said gear piece and said disk portion to permit microadjustment of a distance between said gear piece and said disk portion by said screw.

* * * * *